United States Patent
Bronstein et al.

(10) Patent No.: US 6,414,755 B1
(45) Date of Patent: Jul. 2, 2002

(54) AUTOMATED DIGITAL PRINTING WORKFLOW AND A METHOD OF AUTOMATIC BLEED GENERATION

(75) Inventors: Rafail Bronstein, Kfar Saba; Yaron Goldstein, Tel Aviv, both of (IL)

(73) Assignee: Creoscitex Corporation Ltd., Herzlia (IL)

( * ) Notice: Subject to any disclaimer, the term of this patent is extended or adjusted under 35 U.S.C. 154(b) by 0 days.

(21) Appl. No.: 09/161,002

(22) Filed: Sep. 25, 1998

(30) Foreign Application Priority Data

Sep. 30, 1997 (IL) ................................. 121875

(51) Int. Cl.$^7$ .............................................. G06K 15/02
(52) U.S. Cl. ....................................... 358/1.15; 358/1.9
(58) Field of Search ......................... 358/1.5, 1.6, 1.11, 358/1.12, 1.13, 1.14, 1.9, 1.18, 401, 448, 449; 347/16; 382/162, 163, 164, 165, 166, 167, 255, 266

(56) References Cited

U.S. PATENT DOCUMENTS

| | | | |
|---|---|---|---|
| 4,745,438 A | | 5/1988 | Acquaviva et al. ........... 355/14 |
| 5,279,453 A | | 1/1994 | Hashimoto |
| 5,631,747 A | * | 5/1997 | Farrell et al. ............... 358/448 |
| 5,825,996 A | * | 10/1998 | Davis et al. ................ 358/1.18 |
| 5,881,210 A | * | 3/1999 | Guay et al. .................. 358/1.9 |

FOREIGN PATENT DOCUMENTS

WO     WO 96/32811     10/1996

OTHER PUBLICATIONS

"Getting it Printed" by Mark Beach, North Light Books, Cincinnati, 1993, p. 107.*
"PostScript® Language Reference Manual", Adobe Systems Inc., Addison–Wesley Inc., Feb. 1990.*
Scitex Document No. 771–37221, Scitex Full Autoframe For Macintosh® Computers User Guide, Second edition, Feb., 1997.*
"The GATF Glossary of Graphic Arts Terms", By Graphic Arts Technical Foundation, Pittsburgh, PA, 1994.*
"Preflight Checking, Part 2 Technology's Edge: New Tools and PDF"Seybold Report on Publishing Systems, vol. 26, No. 14, ISSN: 0736–7260, Apr. 14, 1997, pp. 3–9, www.seyboldreport.com.*

* cited by examiner

*Primary Examiner*—Mark Wallerson
(74) *Attorney, Agent, or Firm*—Eitan, Pearl, Latzer & Cohen-Zedek (57) ABSTRACT

A method of digitally printing pages with bleed of a document and digital printing apparatus system for printing pages is provided. The information for printing is generated automatically. The method includes the steps of identifying and marking pages with bleed, calculating image size on pages with bleed, determining whether the pages should be printed on a single sized printing medium, and printing all pages of the same document on a selected printing medium when a single sized medium is selected.

18 Claims, 9 Drawing Sheets

AUTOMATED DIGITAL PRINTING WORKFLOW AND A METHOD OF AUTOMATIC BLEED GENERATION

This invention relates generally to image processing and more particularly to the processing of images for printing by digital printing techniques.

BACKGROUND OF THE INVENTION

Printing is a process that involves the production of black and white or color documents on a variety of substrates, predominantly paper. These documents may consist of single or multiple pages. The pages may be conventional (without bleed) or pages with bleed. Bleed is defined as "any image that goes directly to the edge of paper, seeming to run off (bleed) from the sheet" (See "Getting it Printed" by Mark Beach, North Light Books, Cincinnati, 1993, Page 107).

Most documents today are designed using popular page layout programs, such as QuarkXpress or FreeHand, running on Macintosh or PC computers. These application programs are sometimes called Desktop Publishing (DTP) programs. Use of these programs results in a document in digital format such as PostScript®, (For more information on PostScript see the "PostScript® Language Reference Manual", Adobe Systems Inc., Addison-Wesley Inc., February 1990), Portable Document Format (PDF), as defined by Adobe Systems, Inc., in their Nov. 7, 1996, Version 1.2 Document, or other format that is sent to the printer on magnetic or other storage media or via various means of communication. Most DTP page layout programs simulate an onscreen page of a defined size placed on a drawing table. This is called a "page" and the drawing table is called a "pasteboard", The document originator can place graphic elements and text on both the "page" and the "pasteboard", but only the information placed on the area defined as a page will be printed. Elements which overflow from the page to the pasteboard will be cut to the page's limit during separation film or plate preparation, or during the digital printing process.

When a page with bleed is included in a document, the bleed size can be explicitly defined by a DTP application, when placing the elements on the pasteboard, overflowing from the page area. Publication designers commonly consider the entire production process, including finishing, and indicate the pages to be printed with bleed. This is done by providing files with proper embedded bleed information. Sometimes, a hard copy record accompanies the job printing instructions to assist the printer.

When the document is printed by a traditional printing method such as offset gravure or flexography, printing a page with bleed does not present a problem. The image is printed on paper larger than the final page size, and the paper is later trimmed mechanically. The traditional printing process, which includes the prepress stages of film and plate preparation, is a very forgiving one, and bleed may be introduced even if the designer has initially omitted the information. This is done by using manual and electronic prepress tools and methods through which the information to be printed on the page will be retained or added. A hard proof that normally accompanies the traditional printing process is also of help in finalizing job composition and bleed generation.

The emerging digital printing process is different from the traditional one in a number of major aspects. Pages are printed on precut paper, and in many cases, standard size paper is used. Additionally, there is no "prepress" stage between the document origination stage (design) and the printing stage, and no hard copy proof accompanies the job.

As a result, when a document to be printed contains pages with bleed, an automated digital workflow cannot be implemented. The pages with embedded bleed are defined as pages of a larger size than other pages in the same document. To enable the printing of a document containing pages with and without bleed by digital printing methods, the pages with bleed must be identified prior to printing, extracted from the document, printed on a larger sheet of paper that will be trimmed later and manually introduced into a collated document. If such a page identification operation, which is interactive, is not performed, the entire document will be printed on larger paper, and it will then be necessary to trim it in the course of the finishing process. Such a printing method causes additional paper waste and increases the cost of printing.

If the bleed specification was not introduced by the designer during the design stage, but the information needed for bleed generation is present, the printer will have to generate the bleed using interactive prepress tools. In a more extreme case, where the bleed information has been omitted altogether, the page will have to be modified.

In all of these cases, interactive intervention is required by the operator. As the operator's intervention in the process is currently the only way to print pages with bleed in a digital manner, it does not enable the automation of the digital printing process. Also, it adversely affects the key benefits of digital printing; mainly, its ability to maintain a completely automated workflow and print in the electronic collation mode, where the pages are printed in the order that they appear in a complete document.

Among others, the above drawback impedes faster transition from conventional to digital printing methods because of the lack of capability to support a fully automated digital printing workflow. It is the purpose of the present invention to offer a method and apparatus that enables an automated digital printing workflow, including recognition and generation of pages with bleed as well as a method to print them digitally.

SUMMARY OF THE INVENTION

Accordingly, it is a primary object of the present invention to provide a method of automated digital printing of complete documents containing multiple pages. The document may include both pages without bleed and pages with bleed. The pages may be printed by an apparatus that operates on the basis of electrostatic printing, thermal printing, ink jet printing or any other digital printing technique on paper or on any other media, the selection of which may be included in the document.

It is another object of this invention to provide a method of digitally printing pages with bleed, where the pages to be printed are supplied in digital form and the bleed information for printing is generated automatically.

It is still another object of this invention to provide a method of automatically, digitally printing documents containing both images on pages with and without bleed, where the pages with bleed are printed on oversized paper and pages without bleed are printed on regular paper, precut to size.

It is a further object of this invention to provide a method of digitally printing pages with bleed of a document where the pages to be printed are supplied in digital form and where the bleed information for printing is generated automatically, comprising the steps of determining and selecting whether the pages should be of a selected, single size; identifying pages with generated bleed marking, when pages of a single size have been selected; calculating image size on pages with bleed; and printing all pages of the same document on a selected printing medium.

It is a still further object of this invention to provide a method of digitally printing pages with bleed of a document, where the pages to be printed are supplied in digital form and where the bleed information for printing is generated automatically, comprising the steps of determining and selecting whether pages should be of a single size; identifying and separating pages with generated bleed marking, when pages of more than one size have been selected; printing pages without bleed on one size of precut printing medium; and printing pages with bleed on printing medium larger than said one size of precut medium.

Another object of this invention is to provide a method of automatically, digitally printing documents containing both images on pages with and without bleed, where both, the pages with bleed and the pages without bleed, are printed on regular paper, precut to size, and where the pages with bleed and without bleed are electronically collated into one document.

Still another object of this invention is to provide a method of digitally printing pages with bleed of a document, where the images to be printed are supplied in digital form and where the information for printing is generated automatically, comprising the steps of identifying and marking pages with bleed, calculating image size on pages with bleed, determining whether the pages should be printed on a single sized printing medium, and printing all pages of the same document on a selected printing medium when a single sized medium is selected.

A further object of this invention is to provide a digital printing apparatus system for printing pages, some of which have bleed, where the images to be printed are supplied in digital form and where the bleed information for printing is generated automatically comprising, a digital front end having an input, a digital printing engine having at least two print medium sizes on line, said digital front end having interface means for connection with said printing engine for driving it, input source means for connection to the input of said digital front end for providing information in digital form to said digital front end for control of said digital printing engine for pages with and without bleed on appropriate size print medium.

These and other advantages, features and objects will become more apparent from the following description taken in connection with the illustrations in the accompanying drawings.

DESCRIPTION OF A PREFERRED EMBODIMENT

Figure 1A:
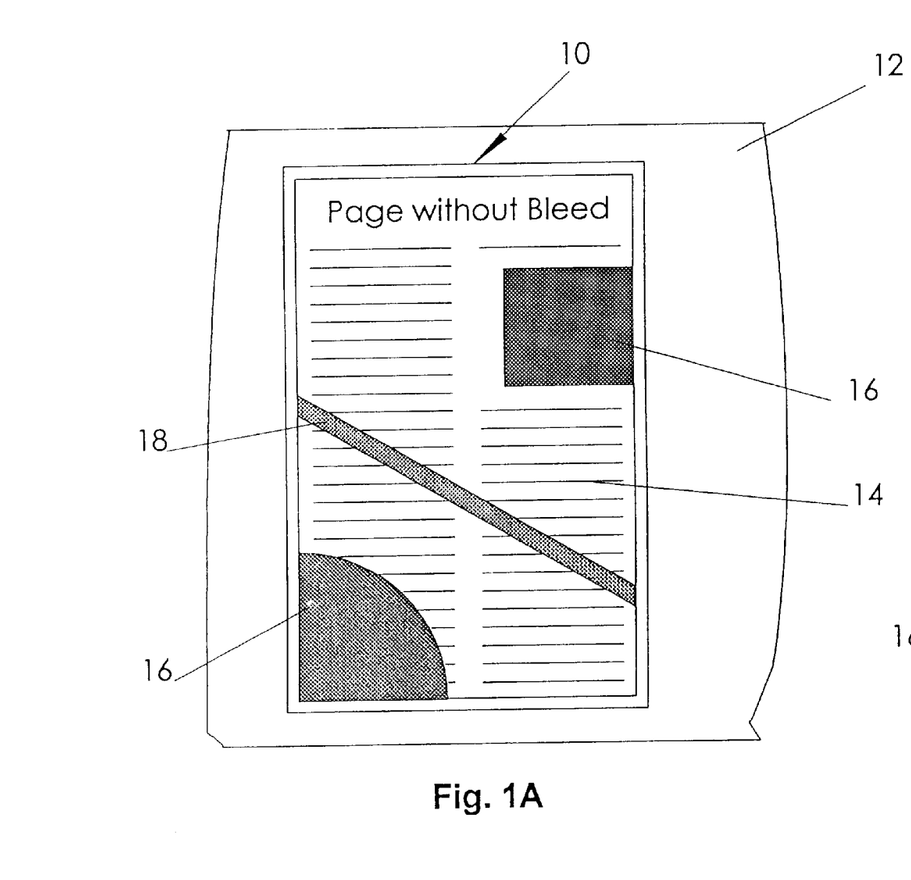
FIG. 1A is a schematic presentation of a page without bleed as designed by a page or document designer.
Figure 1B:
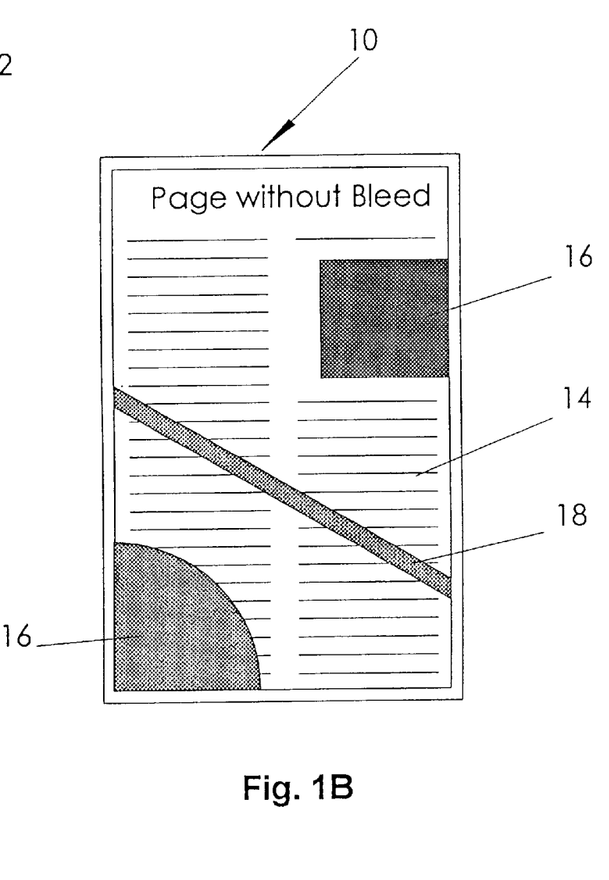
FIG. 1B is a schematic presentation of the page in FIG. 1A as it would be printed.
Figure 2A:
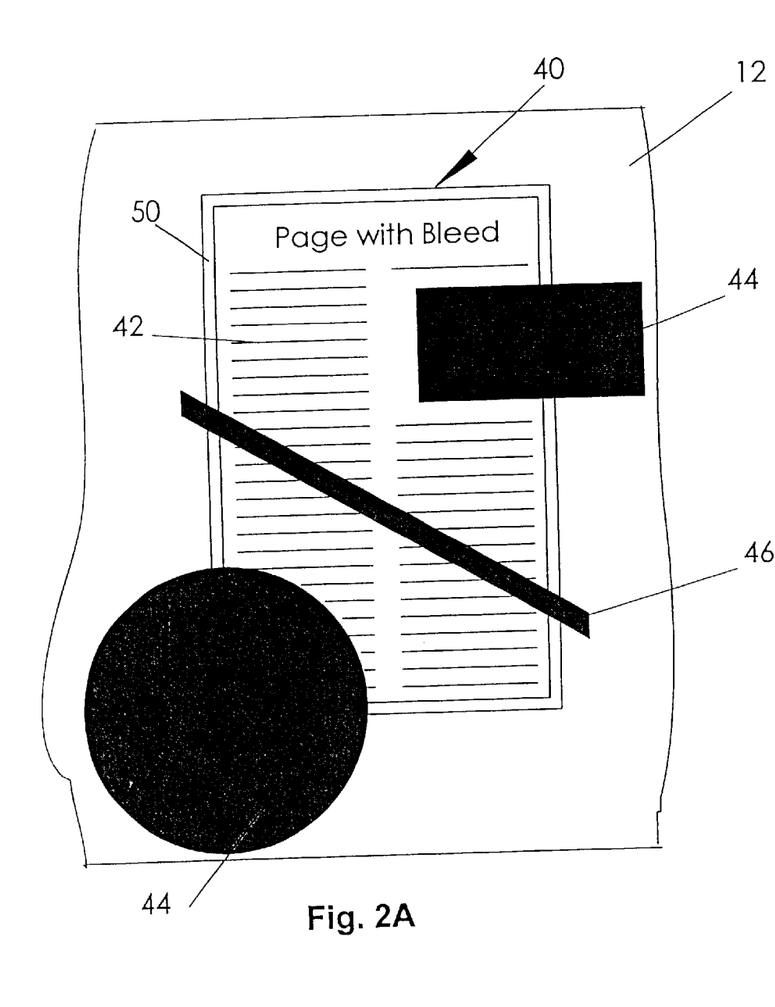
FIG. 2A is a schematic presentation of a page with partial bleed as designed by a designer of the page or document.
Figure 2B:
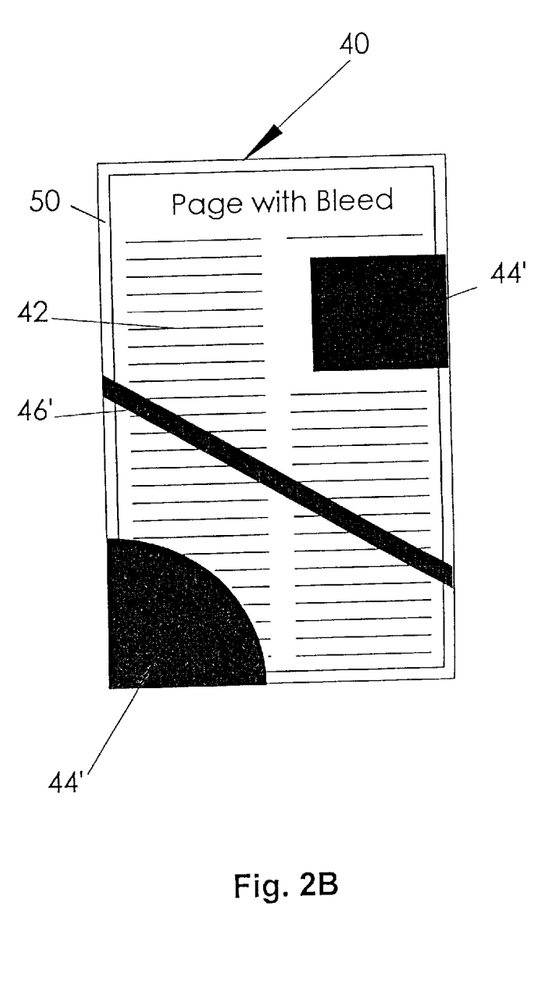
FIG. 2B is a schematic presentation of the page in FIG. 2A as it would be printed.
Figure 3A:
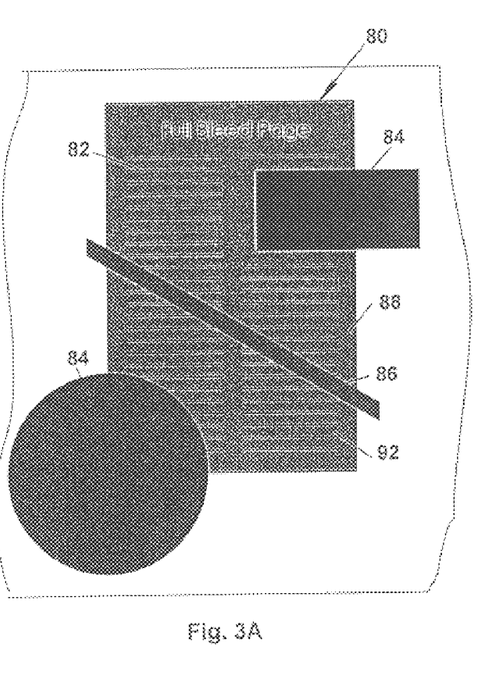
FIG. 3A is a schematic presentation of a page with full bleed as designed by a designer of the page or document.
Figure 3B:
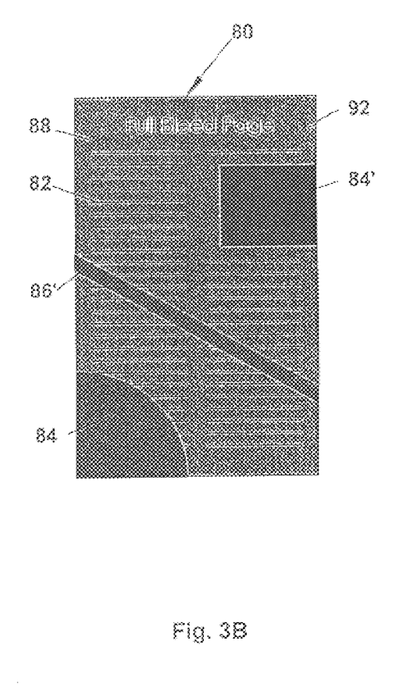
FIG. 3B is a schematic presentation of the page in FIG. 3A as it would be printed.

Referring to the Figures, wherein like numerals represent like items or parts, FIGS. 1 through 3 are schematic representations of various designs of pages, such as those without bleed, with partial bleed and those with full bleed, and their respective end resultant printing. FIG. 1A is a schematic presentation of an arbitrary, conventional page (without bleed) 10 as designed by the designer of the page or document using a DTP system and layout program such as Freehand. The page 10 is shown on the pasteboard 12 (part of a computer screen) and contains textual information 14, pictorial information 16 and line art element 18. FIG. 1B is a schematic representation of a printed page of FIG. 1A. The page 10 contains the design elements; namely, textual information 14, pictorial information 16 and line art element 18.

FIG. 2A is a schematic presentation of an arbitrary page with partial bleed as designed by the designer of the page or document using a DTP system and layout program such as QuarkXpress. The page 40 contains textual. information 42, pictorial information 44 and line art element 46. The pictorial information 44 and line art element 46 have to be printed on a page with bleed as indicated in FIG. 2B, which is a schematic presentation of the printed page of FIG. 2A, where the elements 44' and 46' extend to the edge of the page. The page is supplied to the printer in digital form on magnetic and/or similar storage media or via communication lines in a widely spread PostScript or PDF data format. The page parameters include a definition for bleed size and data to print in the bleed area 50 of the page 40.

FIG. 3A is a schematic presentation of an arbitrary page with full bleed, as designed by the designer of the page or document, using a DTP system and layout program, such as QuarkXpress. The page 80 contains textual information 82, pictorial information 84 and line art element 86. In addition, the page 80 has a colored background 88, covering the entire page area. The pictorial information 84, line art element 86 and background 88 have to be printed on a page with bleed as indicated in FIG. 3B, which is a schematic presentation of the printed page of FIG. 3A, where the elements 84' and 86' and the background 88' extend to the edge of the page.

As in the previous case, the page is supplied to the printer in digital form on magnetic and/or similar storage media or via communication lines in a widely spread PostScript or PDF (portable data format). The page parameters include a definition of bleed size and data to print in the bleed area 92 of the page 80.

Figure 4:
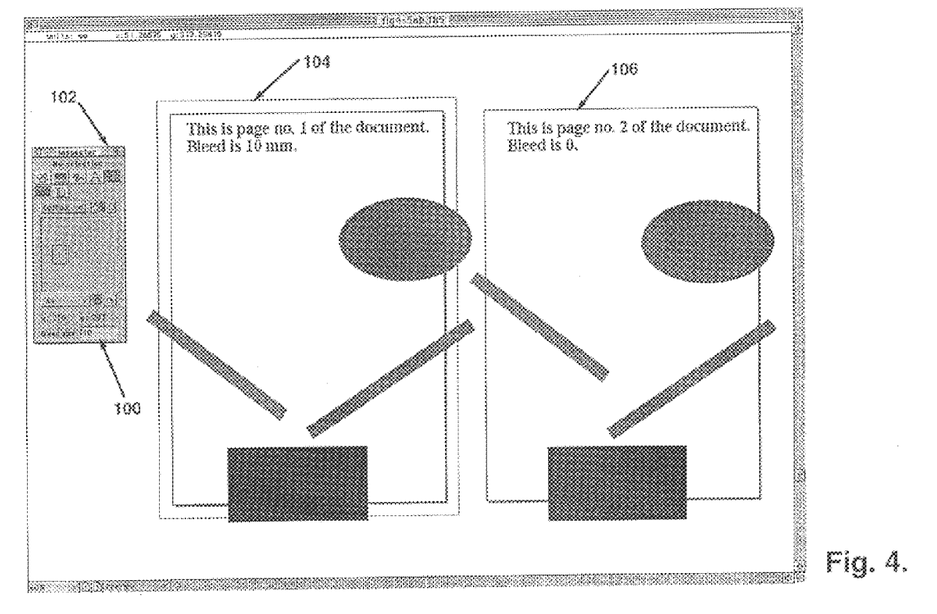
FIG. 4 is a screen capture that illustrates a typical bleed specification sample using the FreeHand page layout program.

The specification of the bleed size is performed by the designer and is usually represented by cutting marks shown on the background of a paper sheet larger than the required size of the page. A typical screen capture illustrating bleed specification using a page layout program such as FreeHand, commercially available from MacroMedia Corporation, San Francisco, Calif. 94103, USA, is shown in FIG. 4. The bleed size is specified as 10 mm. and is clearly shown in the bleed specification field 100 of the Inspector window 102 of FreeHand. For illustration purposes, in addition to the page 104 with bleed, a similar, identical page 106 without bleed is shown, representing part of the same document. During printing, the program will instruct the machine to use the same size, standard precut sheet as for pages without bleed, and the page with bleed will be printed to the edges of the paper. Sometimes, to compensate for mechanical inaccuracies of paper handling, it may be desirable to print an image on a larger than the precut paper size. The printed document will be electronically collated. The flow chart for this printing process is also shown in FIG. 6.

Figure 6:
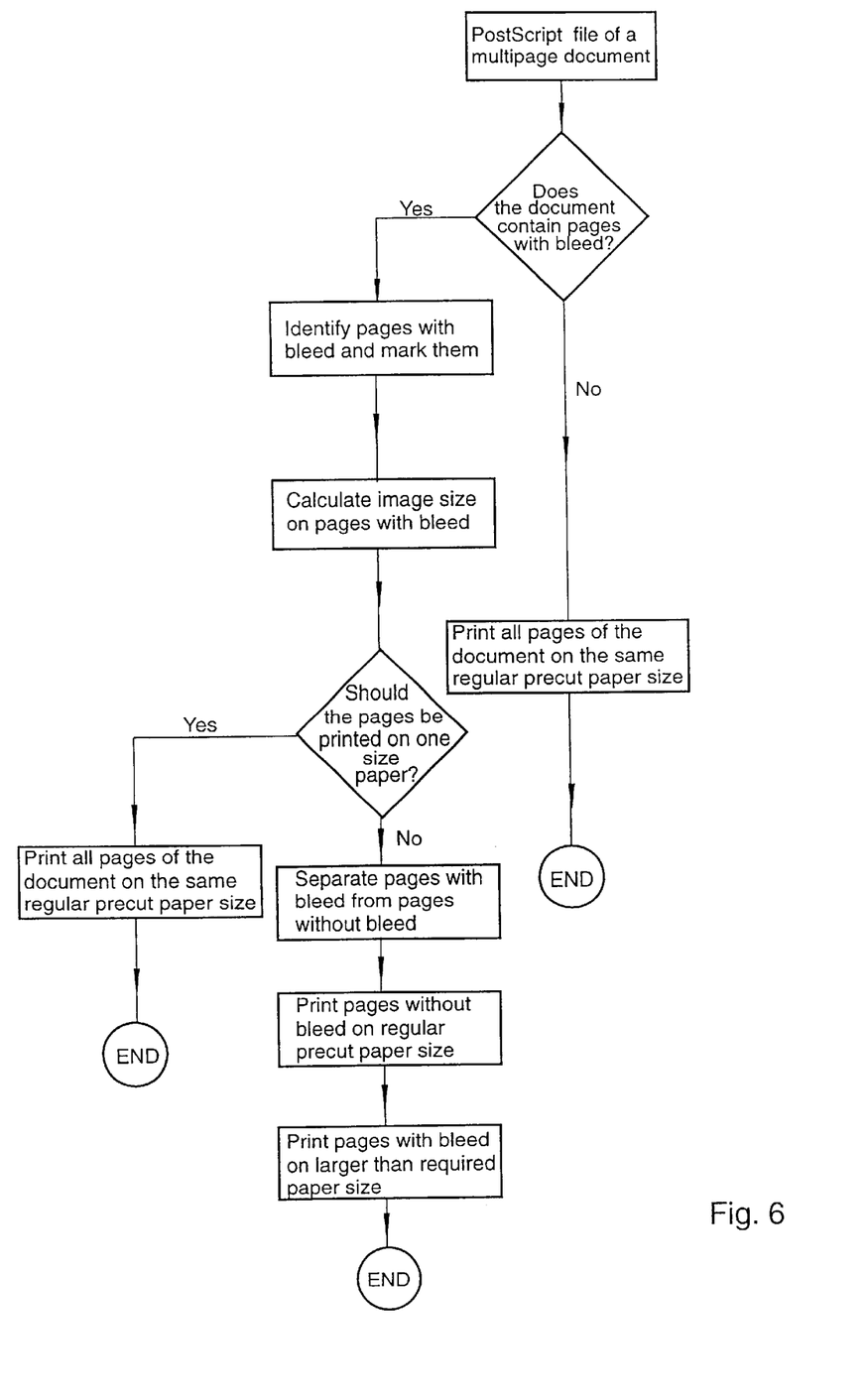
FIG. 6 is a flow chart of a typical program that enables automatic digital workflow for printing of a multipage document, including pages with partial or full bleed, and where the pages with bleed were specified by the designer.

Thus, the steps of the method exemplified by FIG. 6 for a file of a multipage document involves the identification of the presence of bleed in the file. If there is no bleed, all pages of the document would be printed on regular, precut paper, as illustrated. However, when the presence of bleed is indicated, identification and marking of the pages with bleed is effected, and calculation of the image size is performed for these pages. As shown in FIG. 6, a determination of whether the pages should be of one size has to be made. If a single size of regular, precut paper is required, the process follows the left hand column of the figure for the print operation. The middle column of the figure covers the steps required for multisized paper. These steps involve the separation of the pages having bleed, followed by a printing of the pages without bleed and printing separately the pages with bleed on pages larger than those without bleed. Note that automatically separate pages with bleed and their later introduction into a document may require manual interaction. To facilitate this process, specially indexed/marked pages, serving as bookmark pages printed on a regular precut size paper, may be inserted in the document. These pages will be replaced by the pages with bleed in the process of manual collation.

Figure 5A:
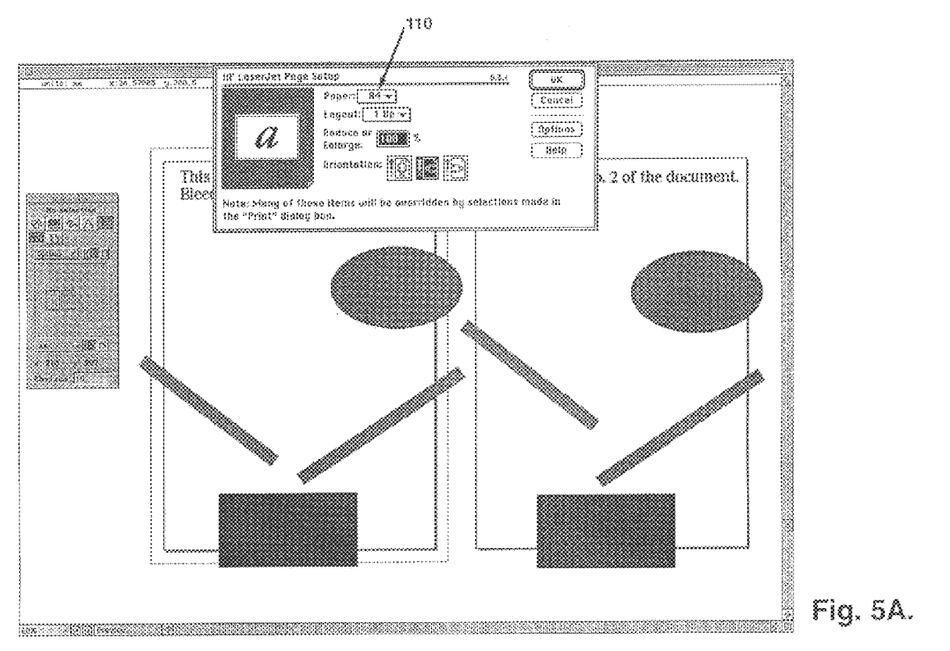
FIG. 5A is a screen capture that illustrates a typical document paper size specification window of a PostScript Printer Driver (PPD)
Figure 5B:
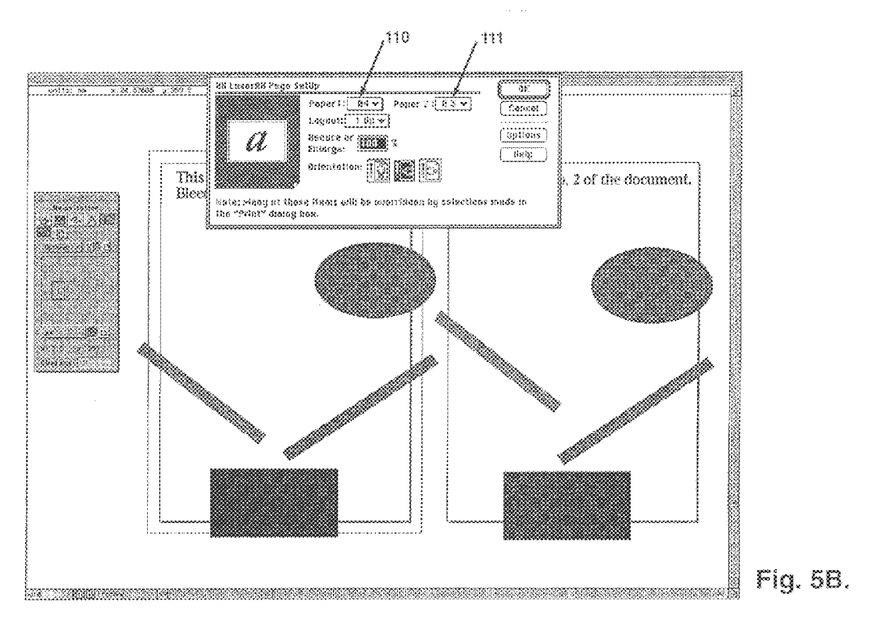
FIG. 5B is a screen capture that illustrates a typical document paper size specification window of a PostScript Printer Driver (PPD) that operates in accordance with the present invention and supports more than one paper size for printing of the same document.

FIG. 5A is a screen capture that illustrates a typical document paper size specification window of a PostScript Printer Driver (PPD). For a particular document the driver supports only one paper size, in this example A4, indicated by a numeral 110. When the size of the finished document is specified as A4, and the document contains pages with bleed, the designer will specify paper for printing of a size larger than A4, so that all of the document pages will be printed on a larger paper size than the required A4 size. FIG. 5B is a screen capture that illustrates a typical document paper size specification window of a PostScript Printer Driver (PPD) that operates in accordance with the present invention and supports more than one paper size for the printing of the same document The program that performs the automatic bleed detection will detect the bleed size specification. Once the bleed size specification is detected, the printing may proceed in two directions:

First, the program will generate a bounding box corresponding to the size of the page+bleed. Then, it will process and generate the data to be recorded, and depending on the print run length required and finishing equipment available, the program will automatically separate the pages with bleed and print them separately on larger than required paper. These sheets of papers will later be trimmed and manually introduced into a collated document. The pages without the bleed will be printed on a regular precut to size paper sheets. The flow chart for this printing process is illustrated in FIG. 6.

Alternatively, the program will generate a bounding box corresponding to the size of the page+bleed, and process and generate the data to be recorded.

If the designer of the document occasionally omits the bleed size specification, but the page is marked as a page with bleed, this does not mean that the information required for bleed generation is not present in the file or document, and the bounding box may be generated to extend up to the bleed size. If the relevant information to be printed in the bleed area is not present, then in order to enable bleed generation, the program will act as described below relative to FIG. 7.

Figure 7:
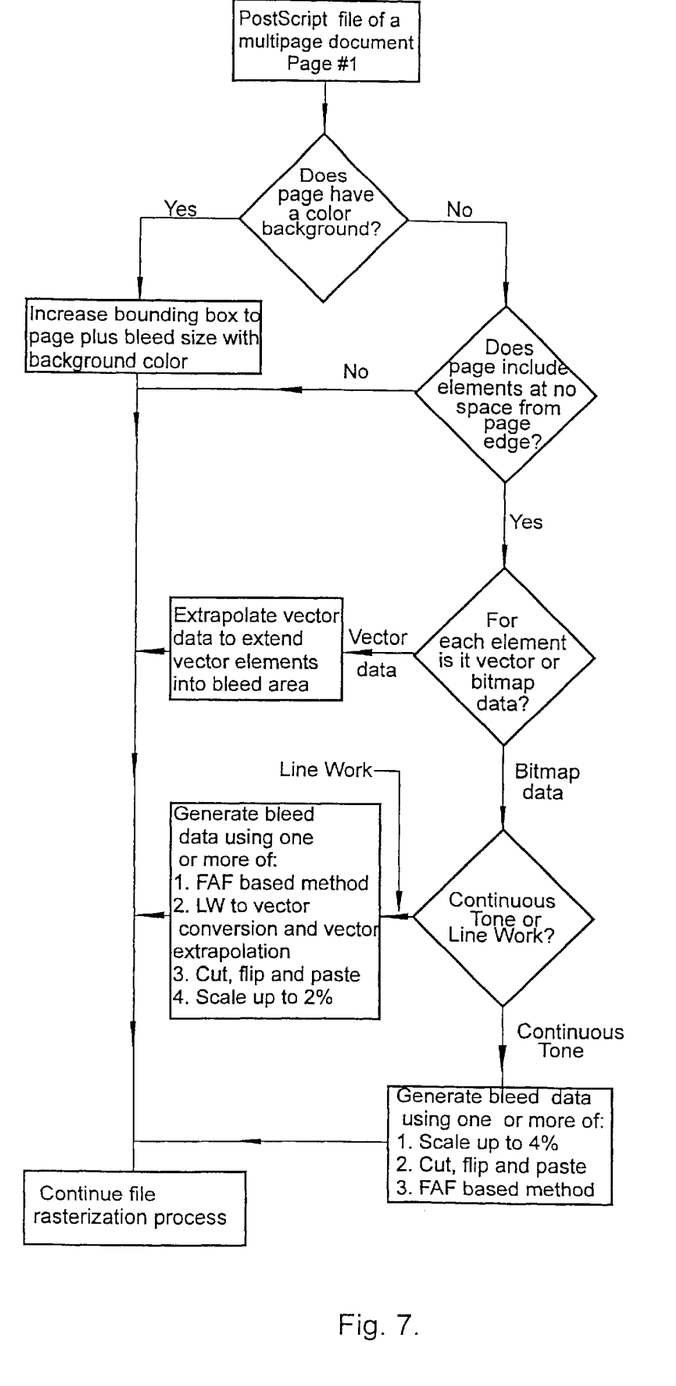
FIG. 7 is a flow chart of a typical bleed decision flow program that enables automatic digital workflow for printing of a multipage document, including pages with partial or full bleed.

The method involves the checking whether the background is a color, and if so, the program will extend the bounding box to accommodate the size of the image needed to generate a page with bleed. Following this, the program will continue to look for design elements other than the background, which are present on the page and extend to the edge of the page. If such elements are present in the file, the program will continue to check further in order to verify whether the color of the elements extending to the edge of the page differs from the background color. If design elements that extend to the edge of the page are present in the file, the program will generate a bounding box corresponding to the size of the page+bleed, and process and generate the data to be recorded. Then, the program will proceed according to one of the possibilities described above; i.e. print on standard or oversized paper. If design elements that extend to the edge of the page are not present in the file, then the page is conventional, does not require a bleed, and may be printed like any other page.

If the bleed specifications have not been introduced by the designer during the design stage of a multipage document, this does not mean that the information required for bleed generation is not present in the file or document. Should there be a requirement to introduce bleed on some of the pages, the document will be conventionally returned to the designer for modification of the appropriate pages. In digital printing the information to be printed on the bleed area may be generated or extrapolated from the design elements existing on the page. To enable this, the operator interactively identifies and marks the pages to be printed with bleed, and the program acts according to the flow diagram of FIG. 7.

There are a number of ways to restore or introduce the relevant information to be printed on the bleed areas. These are: Scale CT (continuous tone) up to 4%; Scale LW (line work) up to 2%; Extrapolate vector data; Cut, flip and paste; Trapping or Scitex Full Autoframe (FAF) methods; and LW conversion to vector and vector extrapolation. Scitex Full Autoframe is described in Scitex Document No. 771-37221, Scitex Full Autoframe, Second edition, February, 1997.

Figure 8:
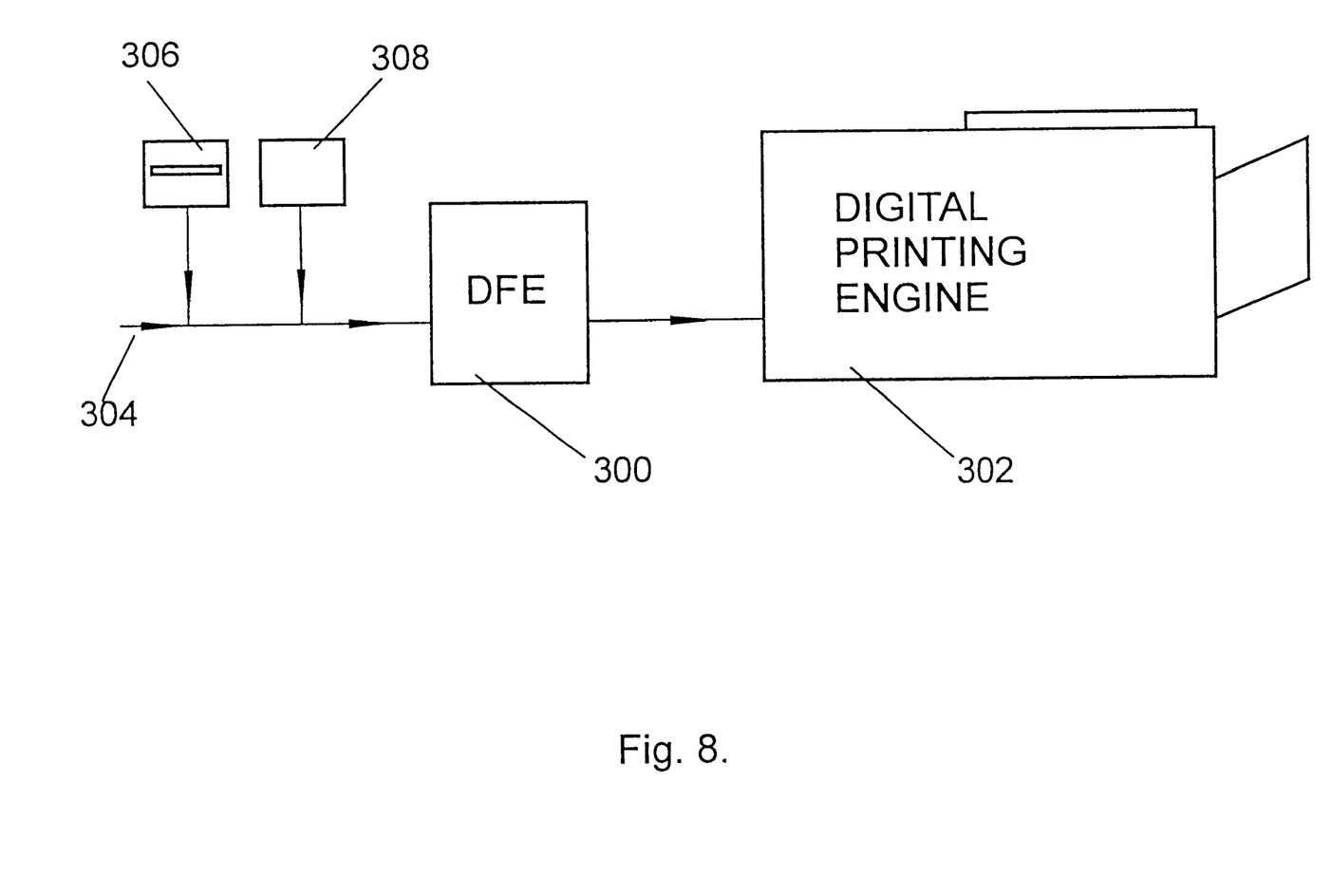
FIG. 8 is a block diagram presentation of a digital printing apparatus capable of utilizing the method of this invention.

The method of automatic, digital bleed data generation may operate on any existing Digital Front End (DFE), such as Scitex Spontane, commercially available from Scitex Corporation, Ltd., Herzlia, Israel. A typical digital printing system apparatus scheme is illustrated with reference to FIG. 8. A DFE, designated at 300, drives a digital printing engine 302, such as a Xerox Regal or a Canon CLC 1000, each of which has on-line up to four different paper sizes. The DFE 300 may be a Victory type Power PC, commercially available from IBM, with appropriate interface boards to the printing engine 302. Communication lines 304, 306 and 308 refer to examples of commercially available lines typically used in print production via which the digital documents are provided to the input of the DFE 300. Numeral 304 indicates a remote communication input, such as a modem using analog communication line or a digital communication line of any suitable bandwidth, while 306 represents the input from a removable magneto-optical disk and numeral 308 could be a digital magnetic input. Other types of input sources may be connected to the system as desired or necessary.

Definitions of terminology in this specification may be found in "THE GATF GLOSSARY OF GRAPHIC ARTS TERMS", By Graphic Arts Technical Foundation, Pittsburgh, PA, 1994.

Although the invention has been illustrated in the accompanying drawings and described in the foregoing specification in terms of a particular method, the invention, as is apparent to those skilled in the art, can have certain changes, modifications and substitutions without departing from the spirit and scope of the appended claims. Rather the scope of the present invention is defined only by the claims which follow.

What is claimed is:

1. A method of digitally printing pages with bleed of a document where images to be printed are supplied in digital form and where the bleed information for printing is generated automatically, comprising the steps of
    identifying and separating pages with generated bleed marking, when pages of more than one size have been selected;
    printing pages without bleed on one size of precut printing medium; and
    printing pages with bleed on printing medium larger than said one size of precut medium.

2. A digital printing method for printing pages with bleed, according to claim 1, wherein the step of identifying pages with bleed includes the marking of a page on said one size of medium for each page of bleed to serve as a bookmark, printed with the pages without bleed, for substitution by the appropriate page with bleed during collation.

3. A digital printing method for printing pages with bleed, according to claim 1, and wherein the pages with bleed are printed on oversized paper.

4. A digital printing method for printing pages with bleed, according to claim 1, and wherein the pages with bleed are printed on paper precut to size.

5. A digital printing method for printing pages with bleed, according to claim 4, and wherein the pages with bleed are electronically collated, thereby providing for automatic workflow.

6. A digital printing method for printing pages with bleed, according to claim 1, and wherein the ink jet printing method is used for the printing step.

7. A digital printing method for printing pages with bleed, according to claim 1, and wherein electrophotographic printing provides the printing step.

8. A digital printing method for printing pages with bleed, according to claim 1, and wherein thermal transfer printing provides the printing step.

9. A digital printing method for printing of pages with bleed, according to claim 1, and wherein dye sublimation printing provides the printing step.

10. A method of digitally printing a page with images that bleed off said page, where the images to be printed are supplied in digital form and where the information for printing is generated automatically, comprising:
    identifying and marking pages with bleed;
    calculating image size on pages with bleed;
    determining whether the pages should be printed on a single sized printing medium; and
    printing all pages of the same document on a selected printing medium when a single sized medium is selected, wherein the bleed information was received from a page designer and recognized automatically at the printing stage.

11. A method of digitally printing a page with images that bleed off said page, where the images to be printed are supplied in digital form and where the information for printing is generated automatically, comprising
    identifying and marking pages with bleed;
    calculating image size on pages with bleed;
    determining whether the pages should be printed on a single sized printing medium; and
    printing all pages of the same document on a selected printing medium when a single sized medium is selected wherein the bleed information was received from a page designer and recognized automatically at the printing stage and wherein tile pages with and without bleed are printed on an oversized printing medium.

12. A method of digitally printing a page with images that bleed off said page, where the images to be printed are supplied in digital form and where the information for printing is generated automatically, comprising:
    identifying and marking pages with bleed,
    calculating image size on pages with bleed,
    determining whether the pages should be printed on a single sized printing medium, and
    printing all pages of the same document on a selected printing medium when a single sized medium is selected, wherein the pages with bleed are printed on paper precut to size, and wherein the pages with bleed are electronically collated into a document.

13. A digital printing system for printing pages, some of which include images that bleed off the pages, where the images to be printed are supplied in digital form and where the bleed information for printing is generated automatically, the system comprising:
    a digital front end having an input; and
    a digital printing engine having at least two print medium sizes on line, said digital front end having interface means for connection with said ping engine for driving it and input source means for connection to the input of said digital front end for providing information in digital form to said digital front end for control of said digital printing engine for pages with and without bleed on an appropriate size print medium, including means for electronic collating of pages with bleed.

14. A method of digitally printing a page with images that bleed off said page, where the images to be printed are supplied in digital form and where the information for printing is generated automatically, comprising the steps of:
    identifying and marking pages with bleed;
    calculating image size on pages with bleed;
    determining whether the pages should be printed on a single sized printing medium; and
    printing all pages of the same document on a selected printing medium when a single sized medium is selected.

15. A method of digitally printing a page with images that bleed off said page, according to clam 14, wherein the bleed information was not introduced by a page designer but is present on the page and is recognized automatically at the printing stage.

16. A method of digitally printing a page with images that bleed off said page, according to claim 14, wherein the bleed information was not introduced by a page designer and was automatically extrapolated from the existing page elements and recognized automatically at the printing stage.

17. A method of digitally printing a page with images that bleed off said page, according to claim 14, wherein the pages with bleed are printed on paper precut to size.

18. A digital printing system for printing pages, some of which include images that bleed off the pages, where the images to be printed are supplied in digital form and where the bleed information for printing is generated automatically, the system comprising:

a digital front end having an input;

a digital printing engine having at least two print medium sizes on line, said digital front end having interface means for connection wit said printing engine for driving it; and input source means for connection to the input of said digital front end for providing information in digital form to said digital front end for control of said digital printing engine for pages with and without bleed on appropriate size print medium.

* * * * *